United States Patent [19]

Arroyo et al.

[11] Patent Number: 4,946,237

[45] Date of Patent: Aug. 7, 1990

[54] CABLE HAVING NON-METALLIC ARMORING LAYER

[75] Inventors: Candido J. Arroyo, Lithonia; Paul F. Gagen, Duluth, both of Ga.

[73] Assignee: AT&T Bell Laboratories, Murray Hill, N.J.

[21] Appl. No.: 375,170

[22] Filed: Jun. 30, 1989

[51] Int. Cl.⁵ .............................................. G02B 6/44
[52] U.S. Cl. .................................................. 350/96.23
[58] Field of Search .......................... 350/96.23, 96.20

[56] References Cited

U.S. PATENT DOCUMENTS

| | | | |
|---|---|---|---|
| 3,030,188 | 4/1962 | Eversole | 423/46 |
| 3,878,444 | 4/1975 | Miller | 317/262 |
| 3,973,385 | 8/1976 | Roe | 57/144 |
| 4,022,010 | 5/1977 | Gladenbeck et al. | 57/149 |
| 4,146,302 | 3/1979 | Jachimowicz | 350/96.23 |
| 4,171,463 | 10/1979 | Watkins | 174/120 R |
| 4,309,072 | 1/1982 | Tweeddale | 350/96.23 |
| 4,374,608 | 2/1983 | Anderson | 350/96.23 |
| 4,437,789 | 3/1984 | Kasiewicz | 405/156 |
| 4,514,036 | 4/1985 | McDonald | 350/96.23 |
| 4,557,560 | 10/1985 | Bohannon, Jr. et al. | 350/96.23 |
| 4,652,861 | 3/1987 | Domes | 340/539 |
| 4,731,134 | 3/1988 | Alloin | 156/53 |
| 4,743,085 | 5/1988 | Jenkins et al. | 350/96.23 |
| 4,770,489 | 9/1988 | Saito et al. | 350/96.23 |
| 4,818,060 | 4/1989 | Arroyo | 350/96.23 |
| 4,874,219 | 10/1989 | Arroyo et al. | 350/96.23 |

FOREIGN PATENT DOCUMENTS 0090585 3/1983 European Pat. Off. .

OTHER PUBLICATIONS

Article entitled "The Gopher and Buried Cable" authored by R. A. Connolly and N. J. Cogelia appearing in the Apr. 1970 Bell Labs Record.

Article by G. J. Beveridge et al., entitled "Fiber Cable Wears an Extruded Jacket" in Apr. 15, 1985 issue of Telephone Engineer and Management.

Article authorized by R. N. Boggs entitled "Diamond Thin Film: Hot New Material for the '90s" appearing in Apr. 10, 1989 Design News, p. 70.

C. J. Arroyo et al., 15–10 Application Ser. No. 07/194,760 filed 5/17/88 Two brochures of Stratoglas, a division of Air Logistics Corp.

Primary Examiner—Frank Gonzalez
Assistant Examiner—Phan T. Heartney
Attorney, Agent, or Firm—Edward W. Somers

[57] ABSTRACT

An animal-resistant optical fiber cable (20) includes a core (22) which comprises a transmission medium and a sheath system. The sheath system includes an outer jacket (65) and a dielectric armor (40) in the form of a shell. The shell comprises a plurality of longitudinally extending preformed segments (42—42) each being a composite comprising a substrate portion (50) and a layer (52) of a coating material which has a relatively high hardness disposed on an outer surface of the substrate portion. Each of the segments covers less than half of the periphery of the core and, in a preferred embodiment, eight segments are used. Further, the shell segments are stranded helically about the core with at least portions of longitudinal edge surfaces of adjacent segments being in engagement with each other. The shell segments not only provide rodent protection for the cable, but also they provide suitable tensile and compressive strength as well as suitable flexibility and cable bending performance. Further, because the cable in a preferred embodiment has an all-dielectric sheath system, it is inherently lighting, corrosion and EMP resistant.

22 Claims, 3 Drawing Sheets

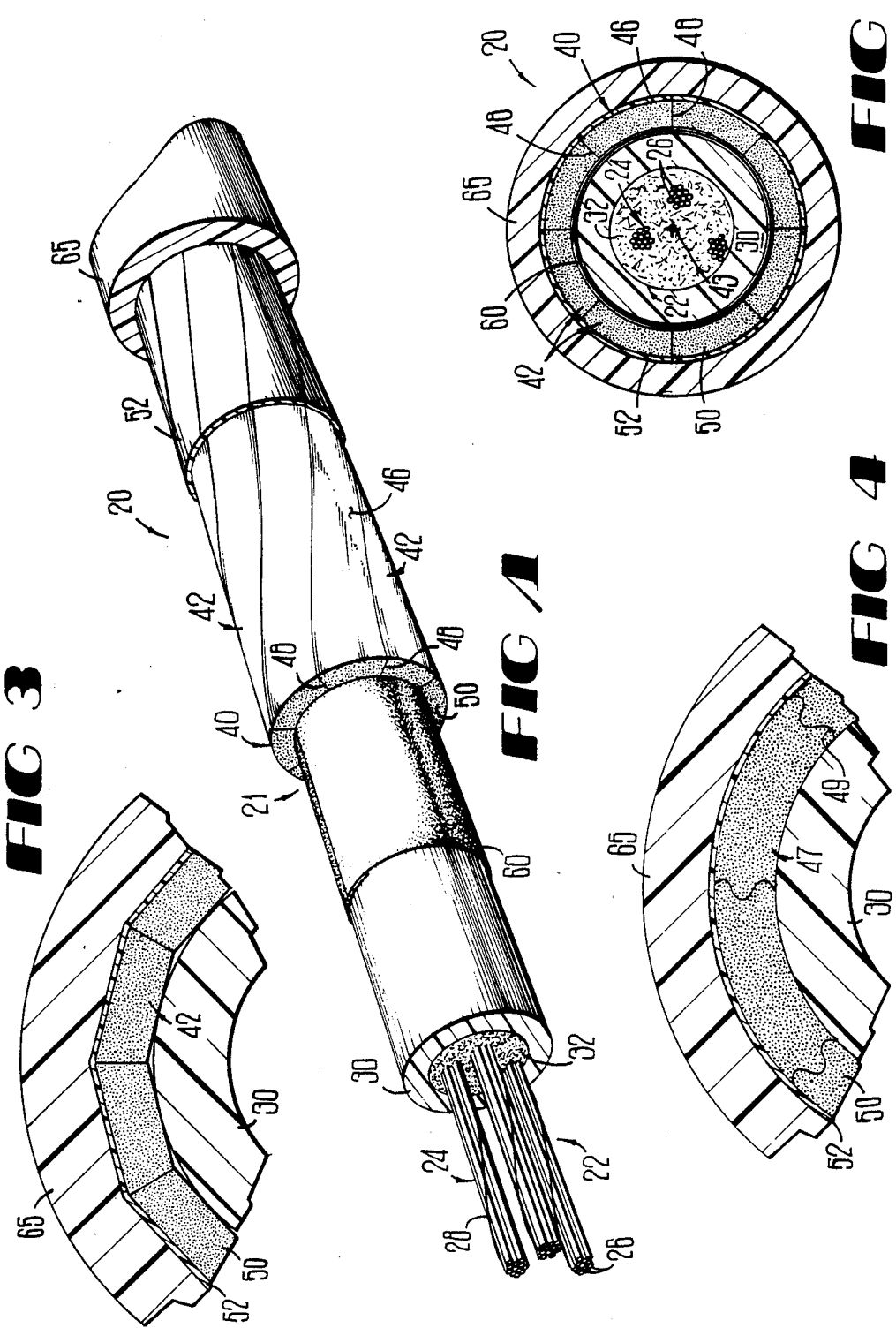

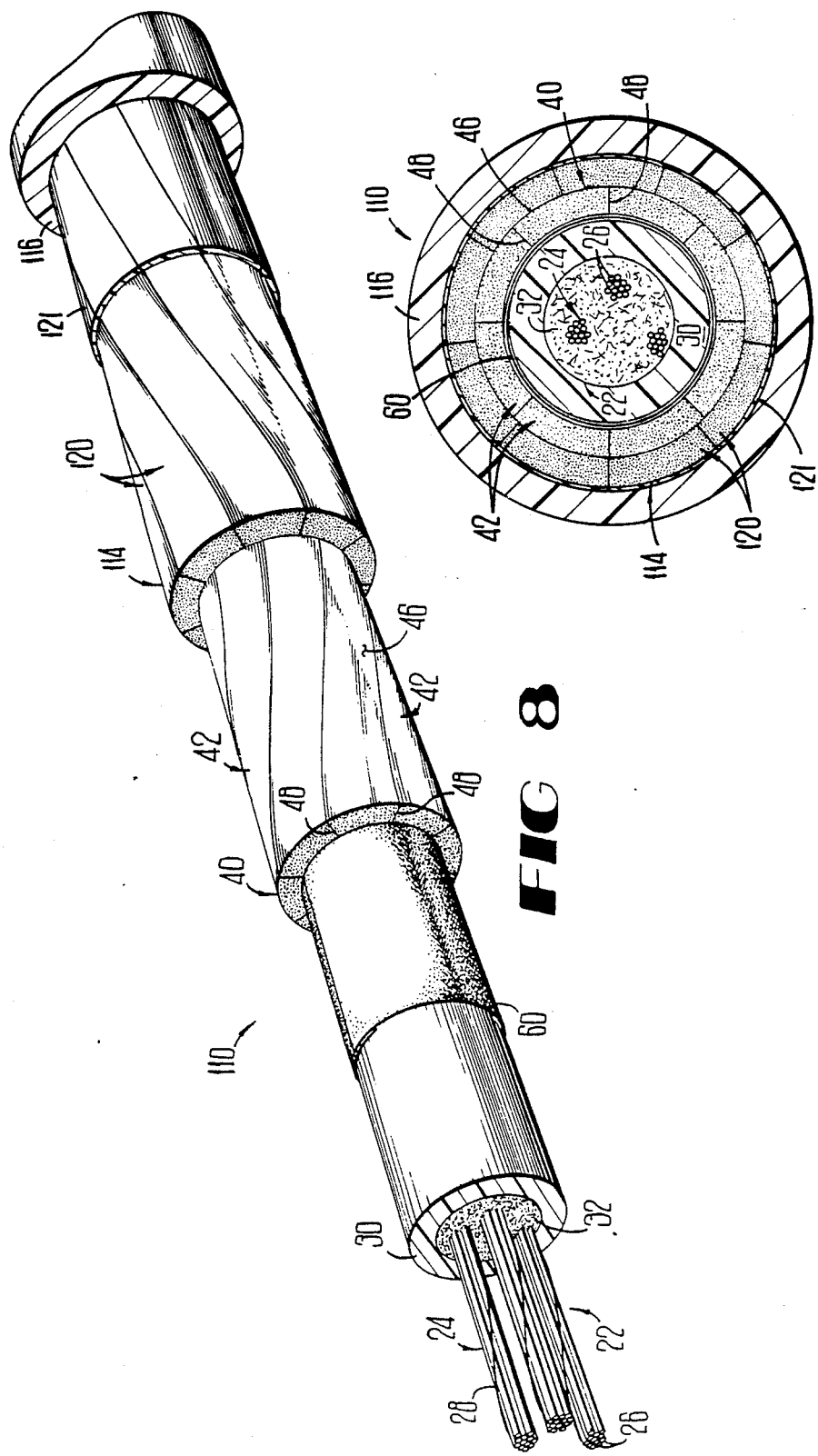

CABLE HAVING NON-METALLIC ARMORING LAYER

TECHNICAL FIELD

This invention relates to a cable which has a non-metallic armoring layer and which is effectively animal resistant over a relatively wide range of outer cable diameters. More particularly, it relates to a cable having at least a partially dielectric sheath system which includes a plurality of coated, longitudinally extending members which are disposed about a core of the cable and which provide excellent protection against rodents, for example, while not affecting adversely the flexibility of the cable.

BACKGROUND OF THE INVENTION

As is well known communications cables may be subjected to abuse such as, for example, attack by animals, mechanical abrasion and crushing. Attacks by gophers on buried cable and by squirrels on aerial cable have been a continuing concern. Gophers, for example, have been shown to exert biting pressures as high as 124,044k Pa. Cables which have an outside diameter below a size of about 1.07 cm in diameter and which do not have suitable, protective armor are more apt to be damaged than larger cables because the animals can bite directly down on them. For larger size cables, only a scraping or raking action takes place. In fact, on cables exceeding about 5.1 cm in diameter, gopher attack is rarely observed.

An excellent discussion of this problem was presented at the 25th International Wire and Cable Symposium. A written version of that presentation appears beginning at page 117 in the proceedings of that conference being authored by N. J. Cogelia, G. R. LaVoie, and J. G. Glahn and being entitled "Rodent Biting Pressure and Chewing Action and Their Effects on Wire and Cable Sheath".

Many rodents, and in particular the plains pocket gopher (*Geomys bursarius*) and the fox squirrel (*Scirus niger*), habitually chew on communication cables. Such chewing frequently causes immediate damage to the cable's wiring or optical fibers or results in damage when rain water or other moisture enters holes gnawed through protective outer jacketing. In the case of rodents, chewing on objects which are tough in composition is necessary to prevent their ever-growing incisor teeth from overgrowing. Thus, for relatively small cables, simply providing a relatively hard outer cable jacket, such as rigid polyvinyl chloride (PVC), for example, is insufficient and may even provide an inducement rather than a deterrent to chewing by rodents.

Because it is frequently undesirable or impractical simply to kill the rodents, it is necessary to devise non-lethal apparatus and methods whereby rodents will be prevented or deterred from attacking cables. Numerous behavioral studies have been performed which show that behavioral barriers can be induced by causing an undesirable effect to result immediately after an act such as chewing, for example, is performed by an animal. The animal then associates the undesirable result with the immediate preceding act and thereafter changes its behavior to prevent the undesirable result. In one prior art patent, this knowledge is utilized to incorporate in a cable assembly, a non-lethal but toxic chemical agent which is capable of causing rapid illness thereby inducing a behavioral barrier resulting in a behavioral change opposed to the cable chewing.

It has been found that an effective way to protect directly exposed cables from rodent attack is to wrap them in a metallic shield, preferably one which is longitudinally applied. The prior art is replete with patents relating to metallic sheath systems for copper core cables such as one comprising an aluminum shield enclosed by a carbon steel shield with each having a longitudinal seam. This sheath system offers protection from mechanical damage, and its cost is quite low because it is made in a single pass at relatively high line speeds. However, the use of a shield which is made of carbon steel occasionally has resulted in long term failures, even in cables larger than 2 cm. Failure may occur because the underlying steel shield may become exposed when rodents violate the jacket. Once exposed, the steel shield, which withstands the initial attack by rodents, may corrode readily. This may render it ineffective for general mechanical protection and for protection from any subsequent rodent attack. In this regard, it should be pointed out that gophers are territorial animals which repeatedly return to areas previously occupied by them. Therefore, it is not uncommon to experience secondary attacks in the same location along a cable. The prior art also includes the use of stainless steel shields to protect against rodent attacks. Stainless steel is used so that after an initial attack, where the steel layer has been exposed, the shield does not corrode readily and can withstand repeated rodent attacks over time. For larger diameter cables, the use of a corrugated shield having a longitudinally overlapped seam generally has provided sufficient protection. However, in the smaller sizes, wherein rodents have been able to encompass the cable with their teeth and pull open the seam, inadequate shield arrangements can lead to failures.

In another prior art approach to rodent protection, an all-dielectric optical fiber cable is disposed within an extruded plastic duct having an inner diameter which is significantly larger than the outer diameter of the cable. Such a structure is disclosed in an article entitled "Fiber Cable Wears An Extruded jacket" which was authored by G. J. Beveridge, et al., and which appeared in the Apr. 15, 1985 issue of *Telephone Engineer and Management* beginning at page 100. The outer diameter of the duct is sufficiently large to prevent rodents from enveloping the duct with their jaws. A cable installation having an additional duct adds to the cost of the installation.

Notwithstanding the hereinabove described solutions, others have been sought after. The use and handling of toxic chemicals is certainly not desired. Ordinary steel shields may corrode and stainless steel shields are not impervious to lightning. Also, the expense in the material cost and the application of an extra duct is a solution which certainly stimulates innovation.

The sought-after cable must be cost-effective and easily manufactured. Hopefully, it provides the cable with protection against rodent attacks without compromising other properties of the cable such as, for example, its flexibility. Further, the sought-after protection must be such that it can be included as a portion of the sheath system for use in any cable, be it one which includes optical fibers or metallic conductors.

There is also a desire that the sought-after cable include an all-dielectric sheath system. Cables which are installed in areas characterized as medium to high lightning areas may be damaged by lightning strikes. Metallic sheathed fiber optic cables can be affected by lightning in several ways. Thermal damage may be caused by the heating effects of the lightning arc whereas in buried cables, mechanical damage may result causing crushing and distortion of the sheath.

As may well be imagined, a cable having an all-dielectric sheath system which provides protection against rodent attacks as well as lightning would be welcomed. Such a cable would provide other advantages. An all dielectric cable avoids problems associated with corrosion. In addition, in the past, the oxidation of metallic sheaths including aluminum has led to the generation of hydrogen which could cause optical fiber transmission losses. An all-dielectric cable sheath system avoids this problem. Also, an all-dielectric cable sheath system offers survivability to electromagnetic pulse (EMP) effects and can be made immune to satellite detection.

An animal-resistant cable which is disclosed in application Ser. No. 194,760 which was filed on May 17, 1988 in the names of C. J. Arroyo and P. D. Patel comprises a core which includes at least one transmission media, and a sheath system which encloses said core. The sheath system is non-metallic and includes a plurality of longitudinally extending preformed strength members. The longitudinally extending members, which are referred to as segments, form a shell that encloses the core. In order to provide sufficient flexibility for the cable to be plowed into the ground in a buried installation, the number of shell segments must be such that each encloses less than one half of the periphery of the core and the shell segments are stranded helically about the core. An outer jacket comprising a plastic material encloses the shell segments.

Although the above-described animal-resistant cable represents a significant advance over the prior art, tests have shown that smaller cables which include such a shell structure still are somewhat vulnerable to attack by rodents. What is desired is a cable structure which is substantially animal resistant over a wide range of outer cable diameters. Further, there has been a desire to reduce the diameter of the cable.

Seemingly, the prior art does not offer a cable structure which is free of the above described shortcomings of presently available cables and which is effective over a wide range of outer cable diameters. There are cables having all-dielectric sheath systems and there are cables which provide protection against rodent attacks and lightning, but there appears to be no sheath system which provides both kinds of protection over the desired wide range of sizes. Such a cable which has long been sought-after must be cost-competitive. Further, it must include a sheath system which is easily removed to access safely the core which could include, for example, optical fibers.

SUMMARY OF THE INVENTION

The foregoing shortcomings of the prior art have been overcome by cables of this invention. An animal-resistant cable comprises a core which includes at least one transmission media, and a sheath system which encloses the core. At least a portion of the sheath system is non-metallic and includes a plurality of longitudinally extending preformed strength members. The longitudinally extending members, which are referred to as segments, form a shell that encloses the core. In order to provide sufficient flexibility for the cable to be plowed into the ground in a buried installation, the number of shell segments must be such that each encloses less than one half of the periphery of the core and the shell segments are stranded helically about the core. An outer element disposed about the segments maintains the segments in the configuration of a shell.

The shell segments which are generally contiguous to each other along at least portions of facing adjacent longitudinal edge surfaces cooperate to form a substantially circular enclosure for the core. In a preferred embodiment, each segment has an arcuately shaped cross section transverse to a longitudinal axis of the cable. As such, that surface of each having the larger radius of curvature is oriented outwardly. The shell segments are preformed to cause the longitudinal edge surfaces of each to extend radially from a longitudinal axis of the cable. In a preferred embodiment, a rodent resistant cable sheath system includes eight shells. Each shell extends about an equal length of the periphery defined by the inner surfaces of the segments.

The shells each are made of a material which discourages repeated attack by the same animal. Each shell segment is a composite and includes an outwardly facing layer of a material which cooperates with the remainder of the shell segment which may be referred to as the substrate portion to cause the shell segment to be characterized by a relatively high hardness. It has been found that the substrate portion of each shell segment may itself be a composite and may be made of fibers embedded in a solid matrix material. The fibers may be organic or inorganic and the matrix material may be a cured resinous material, such as an epoxy resin, for example. Although the substrate portions of the shells preferably are made of a fiberglass material in an epoxy matrix, the invention is not so limited. The substrate portion of this shell system may include any of several materials, i.e. KEVLAR ® fiber, carbon fibers, etc., and is sufficiently thin so as not to affect adversely the flexibility of the cable. The flexibility of the sheath system is enhanced because of the stranding of the shells about the longitudinal axis of the cable and because of the number of shells which are used to provide the circular enclosure.

Provisions also are made to prevent the entry and/or longitudinal movement of water into the cable core. This may be accomplished by introducing a water blocking material into the sheath system either as a coating on the segments or as a separate element of the sheath system.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a cable of this invention;

FIG. 2 is an end cross-sectional view of the cable of FIG. 1;

FIG. 3 is an enlarged end cross-sectional view of segments which are used to provide a shell;

FIG. 4 is an enlarged view of a portion of interlocking shell segments in another embodiment of this invention;

FIGS. 8 and 9 are perspective and end cross-sectional views of still another embodiment of this invention in which inner and outer shells enclose a cable core.

DETAILED DESCRIPTION

Figure 6:
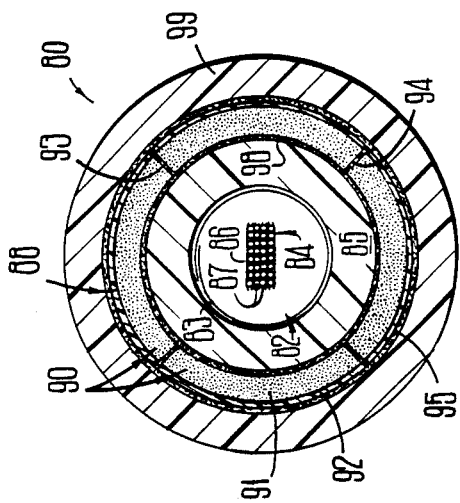
FIG. 6 is an end cross-sectional view of the cable of FIG. 5.

Referring now to FIGS. 1 and 2, there is shown a cable which is designated generally by the numeral 20 and which is a cable having a sheath system at least a portion of which is comprised of a dielectric material. In a preferred embodiment, the cable 20 has an all-dielectric sheath system 21. The structure is such that it provides excellent protection against rodent attacks and lightning.

As can be seen in FIGS. 1 and 2, the cable 20 includes a core 22 which comprises at least one transmission media. For example, the core 22 may comprise one or more units 24—24 each of which includes a plurality of optical fibers 26—26. Each of the units 24—24 is provided with a binder 28. The unit or units is disposed within a tubular member 30 which is made of a plastic material such as polyethylene, for example.

An inner diameter of the tubular member 30 is such as to control the ratio of the total cross-sectional area of the coated optical fibers within the core to the cross-sectional area defined by the inner surface of the wall of the tubular member. This allows the optical fiber unit or units sufficient movement during handling, installation and temperature cycling to avoid losses due to microbending.

Further, the tubular member, or core tube as it is often called, may be filled with a suitable water blocking material 32. Such a material may be one such as that disclosed and claimed in U.S. Pat. No. 4,701,016 which issued on Oct. 20, 1987 in the names of C. H. Gartside, III, et al. and which is incorporated by reference hereinto.

About the core tube is disposed a dielectric armor which is in the form of a shell and which is designated generally by the numeral 40. The shell 40 comprises a plurality of individual preformed segments 42—42. The segments 42—42 are such that they cooperate to provide a generally circular shell 40 for the core tube. In a cross section transverse to a longitudinal axis 43 of the cable (see FIG. 2), each segment may be rectangular or trapezoidal, for example (see FIG. 3).

In a preferred embodiment, each segment 42 is arcuately shaped and is disposed about the core tube such that a surface 46 thereof having the larger radius of curvature is oriented toward the outside of the cable. Further, the segments are arranged so that at least portions of longitudinally extending side edge surfaces 48—48 of each generally are contiguous to longitudinally extending side edge surfaces of adjacent segments. Each shell segment 42 is preformed to cause the longitudinal side surfaces 48—48 thereof to extend generally along radial lines from a longitudinal axis of the cable when the shell segment is disposed about the core. In one embodiment, the segments 42—42 may be bound with a binder (not shown) which is wrapped helically about the shell, although this is not necessary, to hold the segments together. It is within the scope of this invention to include shell segments 47—47 (see FIG. 4) which interlock along longitudinal edge surfaces 49—49 thereof and which have a tongue and groove configuration, for example. This helps to prevent ingress of moisture through the sheath system and into the core and helps to bring the shell segments into alignment during their assembly in a manufacturing process.

The shell 40 may comprise any number of segments 42—42 as long as each covers less than one-half the periphery of the core. In a preferred embodiment, eight segments 42—42 are used. It has been found that the larger the number of segments, the more flexible is the cable. However, too many segments may impede the alignment of the segments during their assembly about the core to form the shell 40. Also, inasmuch as seams between the shell segments may be most susceptible to rodent penetration, an unnecessary increase in the number of segments may increase the vulnerability of the cable to rodent damage.

Each of the segments 42—42 is a composite. A substrate portion 50 of each is made of a dielectric material. Further, the substrate portion of each may itself be a composite comprising, for example, organic or inorganic fibers embedded in a solid dielectric matrix material. In a preferred embodiment, each segment substrate portion comprises glass fibers embedded in a cured epoxy matrix. However, the material from which the substrate portion of the segments are made may be any one of a number of materials which are available commercially. What is important is that such material has relatively high tensile strength, relatively high compressive strength, is non-metallic and is a material which upon contact with the mouths of rodents discourages further attack. Such other materials include, for example, KEVLAR® fiber material, S Glass, T Glass or carbon fiber material in an epoxy matrix. Further, the substrate portion may comprise a single material such as graphite, for example, instead of being a composite.

In the preferred embodiment, the substrate portion for each shell segment 42 includes as many as 4000 continuous unidirectional fiber glass filaments bonded together in an epoxy material matrix. This causes the substrate portion to be rendered capable of withstanding expected compressive as well as tensile stresses. Expected compressive stresses include those which are induced by thermal cycling, and initial shrinkage of the jacket material, for example. In the preferred embodiment, each shell segment 42 is characterized by a tensile stiffness of about 131 kg per one percent strain.

The shell 40 must be such that it does not impair the flexibility of the cable. For a cable which has a non-metallic sheath system and which is plowed into the ground in a buried installation, the cable must be capable of experiencing a bend radius equal to or less than the product of ten and the outer diameter of the cable without damaging the cable. Suitable flexibility is accomplished in two ways, first by causing the segments to be wrapped helically about the tubular member. Of course, the lay may be varied depending on cable size and use. Also, suitable flexibility is achieved by controlling the number of segments 42—42 in the shell 40.

The radial thickness of each shell segment also is important. If too thick, the flexibility of the cable may be affected adversely. If too thin, the segments may break down under stresses imparted to the cable. It has been found that thicknesses in the range of about 0.51–1.02 mm are acceptable, depending, of course, on the cable size.

The required flexibility leads to another problem. As the outer diameter of the cable decreases, the thickness as measured radially, must decrease to maintain that flexibility. For example, for cables having an outer diameter greater than about 1.07 cm, a shell thickness of 0.09 cm is suitable. However, as the outer diameter drops below 1.07 cm, the shell thickness must decrease, otherwise bending capability of the cable is impaired. Unfortunately, as the thickness decreases, the amount of material present to resist animal attack decreases.

In order to overcome this problem, each composite shell segment 42 also includes a layer 52 of a suitable coating material which is applied to an outer surface of each substrate portion. The coating material must be one which together with the substrate layer 50 causes each composite segment to be characterized by a relatively high hardness. As a result, the cable, notwithstanding a relatively small diameter, successfully resists animal attack. Accordingly, the layer 52 comprises a coating material which cooperates with the substrate layer to provide a hardness as measured by Shore D of at least about 90. Typically, the outer layer 52 of each composite shell segment which is applied to an outer surface of each shell segment has a thickness of about 0.0025 cm.

In a preferred embodiment, the coating material is a coating material which is marketed by Sherwin-Williams under the designation PERMACLEAR UV® abrasion resistant clear coating. This is a radiation-curable clear coating and, more specifically, a polycarbonate UV cured material. Properties include a tensile strength of 3000 psi, an elongation of 2% and a modulus of 200,000 psi. When the coating material is applied to the substrate layer and cured, the coating material is caused to adhere sufficiently to the substrate layer so that delamination does not occur.

One alternative material is a diamond film described in a paper authored by D. L. Flamm, T. R. Anthony and Jeffrey T. Glass and entitled "Diamond and Diamond Films—Growth and Characterization", copyright 1988. As disclosed in the foregoing article, such films are chemically inert and have a high elastic modulus. See also U.S. Pat. No. 3,030,188. Diamond particles grown by chemical vapor deposition (CVD) have a hardness of 7000 to 12000 kg/mm$^2$ and a bulk modulus of $44.5 \times 10^{r1}$ dynes/cm$^2$. The bulk modulus of tool steel is $16.5 \times$ dynes $10^{11}$/cm$^2$. The use of diamond films is discussed in an article R. N. Beggs "Diamond Thin Film: Hot New Material For The '90s" appearing in the Apr. 10, 1989 issue of *Design News* beginning at page 70.

It should be apparent that the layer 52 may be applied in several ways. Each shell segment 42 may be preformed to include a layer 52 (see FIG. 1). In the alternative, the layer 52 may be applied to all the segments after they have been formed into the shell (see FIG. 4).

For a cable 20 which includes three units 24—24 each including twelve coated optical fibers having an outer diameter of 250 μm, the inner diameter of the core tube 30 may be about 0.63 cm and the outer diameter about 0.78 cm. Eight shell segments each having a thickness of about 0.90 mm are used to provide an enclosing shell 40. The shell segments are stranded helically each with a lay of about 30 cm.

It may be important that the cable 20 include provisions for preventing the ingress of water to the core. In the embodiment of FIGS. 1 and 2, water entry into the core is prevented by disposing a water blockable tape 60 between the shell 40 and the tubular member 30.

The water blockable tape 60 may comprise a laminate which includes a swellable superabsorbent powder disposed between two layers of synthetic tissues. Preferably, the tape 60 is made of a hydrophobic material which has been treated with a water blockable material. Advantageously, the treated tape is hydrophilic. A hydrophilic material is one that has a strong affinity for water in that it absorbs water easily.

Preferably, the tape 60 is one such as that disclosed in application Ser. No. 115,123 which was filed on Oct. 30, 1987 in the name of C. J. Arroyo and in U.S. Pat. No. 4,815,813 which issued on Mar. 28, 1989 in the names of C. J. Arroyo, H. P. Debban, and W. J. Paucke, both of which are incorporated by reference hereinto.

The sheath system of the cable 20 also includes an outer element 65 which is disposed about the segments 42—42 and which is effective to hold the segments together in the configuration of a shell. In the preferred embodiment, the outer element 65 comprises a jacket. The jacket 65 may be made of a plastic material such as polyethylene and, for a cable which includes three loose fiber bundle units 24—24 of twelve optical fibers each, has an outer diameter of about 1.24 cm. Voids between adjacent longitudinal edge surfaces of adjacent shell segments typically are filled with the jacket material.

In the preferred embodiment, the jacket 65 is decoupled from the shell segments. However, it is within the scope of this invention to cause the shell segments to be bonded to an inner surface of the outer jacket.

The shell 40 of this invention also acts as a thermal barrier. As the jacket is extruded over the shell 40, heat is available for transfer into the core. The segments 42—42 of the cable 20 insulate the core against the heat caused by the extrusion of the jacket. In fact, the shell segments obviate the need for a separate, well-known thermal core wrap about the core tube 30.

Advantageously, because each shell segment 42 is a composite comprising a substrate layer 50 and an outer layer 52, the thickness of the segment may be decreased thereby allowing a reduced outer cable diameter. On the other hand if it is desired to replace uncoated shell segments with coated shell segments in accordance with this invention but to maintain the outer cable diameter, then the thickness of the coated shell segments can be reduced over that of the uncoated and the cable is caused to have increased flexibility.

Figure 5:
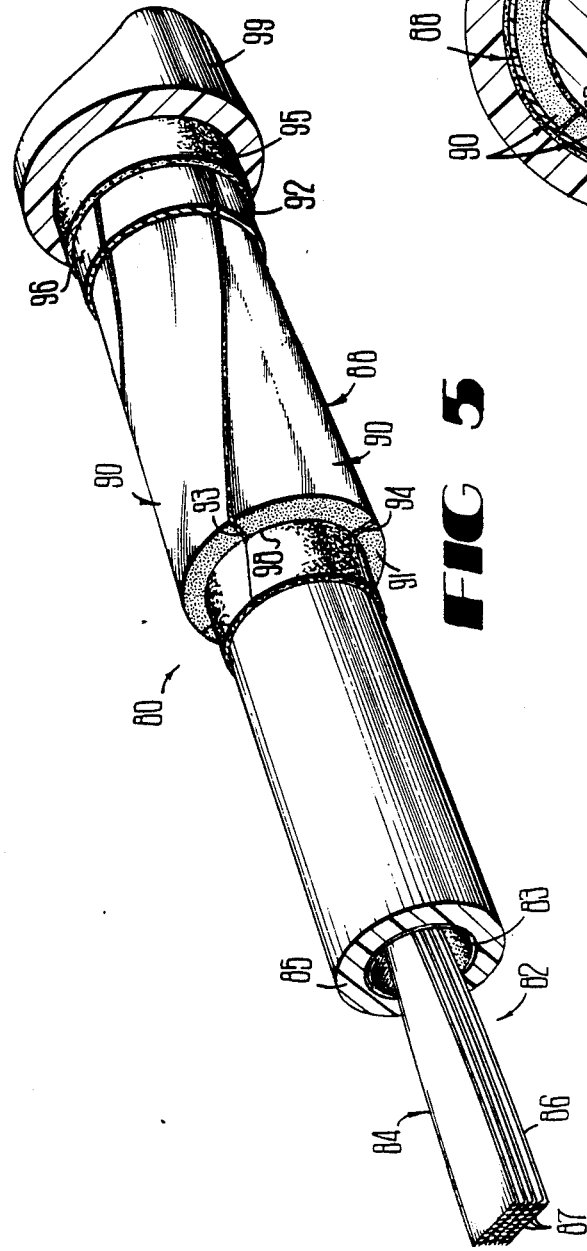
FIG. 5 is a perspective view of an alternate embodiment of a cable of this invention.

In another embodiment which is shown in FIGS. 5 and 6, a cable 80 includes a core 82 comprising transmission media 84 and a core tube 85. The transmission media 84 may be enclosed with a core wrap 83 disposed between the media and the core tube 85. The core wrap 83 protects the media 84 during the extrusion of the core tube 85. In this embodiment, the transmission media 84 may include a plurality of stacked ribbons 86—86. Each ribbon 86 includes a planar array of optical fibers 87—87. Enclosing the core tube 85 is a shell 88 comprising a plurality of arcuately shaped segments 90—90. In this embodiment, the shell 88 comprises four segments 90—90.

In the embodiment of FIGS. 5 and 6, each of the shell segments 90—90 also is a composite including a substrate 91 and a layer 92 of a material such as that used in the layer 52 of the cable of FIG. 1. Disposed on an outer surface of the layer 92 may be a layer 95 of a superabsorbent coating material. The superabsorbent coating material may be one which is used to impregnate the carrier tape 60. Longitudinal side edge surfaces 93 and 94 of each shell segment as well as major surfaces 96 and 98 may be provided with the superabsorbent coating material. Such placement of the coating material and the arrangement of the shell segments with adjacent longitudinal edge surfaces being substantially contiguous will insure that the flow of water through the interfaces created between adjoining segments will be blocked.

Over the shell 88 is disposed a jacket 99. As in the earlier described embodiment, the jacket 99 may be a plastic material such as polyethylene.

The above-described cable is a cable having an all-dielectric sheath system which is attractive from many standpoints. Being all-dielectric it certainly is suitable for use in lightning-prone areas as it would not attract lightning. Also it is non-corrosive thereby avoiding corrosion of metals, helps to avoid the problem of hydrogen generation which can be generated by metallic corrosion in optical fiber cables and avoids the need for a bonding and grounding system.

One of its most important features is its resistance to rodent attack. Being made of a material such as glass, it is not attractive to rodents as something to chew. The segments have great strength, are durable and discourage further attack by rodents after an initial encounter.

One of several gauges of toughness of a sheath system is a parameter referred to as toughness index. It is found by multiplying ultimate tensile strength of the material by the strain at fracture. The toughness index which is expressed as the amount of energy absorbed per unit volume of material in Newtons·meters per cubic meter is modified to minimize effects of other parameters of the cable. Because the modified toughness index which is expressed in units of Newtons·meter per cubic meter is a reliable indicator of the resistance to deformation wear caused by rodents, there is a correlation between increasing toughness and improving performance in rodent cage tests. The rodent cage test is well known and is described in the aforementioned paper by N. J. Cogelia, et al.

Figure 7:
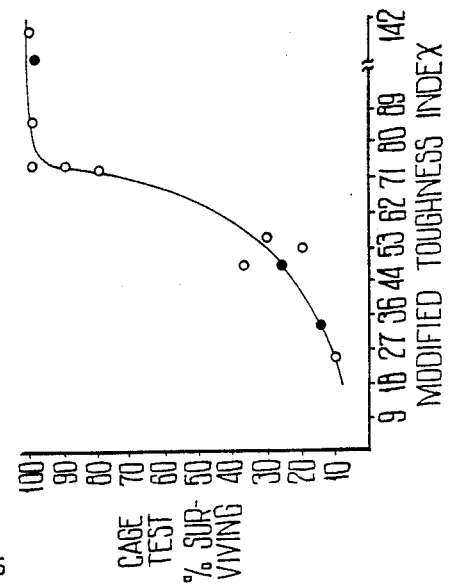
FIG. 7 is a graph which depicts percent of cables surviving in a cage test versus a parameter referred to as modified toughness index.

The relationship between modified toughness index and percent surviving specimens is easily determined from the graph shown in FIG. 7. A correlation of improving performance with increasing toughness is readily apparent.

In the Cogelia, et al. article, a table is provided to show a comparison of relative performance of one and two pair buried or distribution service wires with a helically applied shield. The modified toughness index and rodent cage test percent surviving for a shield comprised of CPA 195 precipitation temper copper alloy were reported at 53 and 20 respectively whereas those parameters for a shield made of stainless steel type 304 annealed were 142 and 100. For an optical fiber cable of this invention having eight segments 0.76–0.89 mm thick with a breaking strength of 357 kg, the modified toughness index was 105 and the percent surviving the rodent cage test was 100.

The cables of this invention have been described as being rodent resistant. The layer of relatively hard material disposed on an outer surface of each shell segment cooperates with the substrate to provide a shell segment characterized by a relatively high hardness to resist penetration by animal teeth. Further, a rodent chewing into the glass fiber supported in an epoxy resin matrix will experience needle-like irritating glass fibers which penetrate the soft gum area of the mouth. This experience discourages subsequent attacks by the same rodent. It should be apparent that such cables are resistant not only to rodents but also to any animals such as sharks, for example, which have a propensity for attacking cables.

In view of the foregoing, it should be readily apparent that the cable of this invention has excellent utility in the outdoor environment because of its outstanding protection against rodents and lightning. However, the cable of this invention also is adaptable to use indoors. Of course, use indoors demands that the cable be fire resistant. The segments which form the shell have excellent resistance to fire and smoke evolution. If the outer jacket is made of a fire-resistant material such as polyvinyl chloride, the cable also may be used indoors as a riser cable, for example.

Referring now to FIGS. 8 and 9, there is shown another embodiment of this invention. A cable 110 includes the core 22 of FIG. 1 as well as the plastic core tube 30 and the shell 40.

In this embodiment, the shell 40 is an inner shell and an outer shell 114 encloses the inner shell. Disposed over the outer shell 114 is a plastic jacket 116.

Each of the shells 40 and 114 includes a plurality of longitudinally extending composite segments 42 and 120 respectively. The segments 120—120 are similar to the segments 42—42 of the cable 20 and the segments 90—90 of the cable 80 and each includes a layer 121 of a relatively hard coating material such as that used to provide the layer of coating material in each shell segment 42—42. As such each may have an arcuate cross sectional shape with the substrate portion of each being made of a material comprising fibers held in a matrix material. At least portions of longitudinal edge surfaces of adjacent segments along radially lines engage each other. Further, the segments 42—42 of the inner shell 40 and the segments 120—120 of the outer shell 114 are wrapped helically about the cable core in opposite directions. Typically, the number of segments in the shell 114 is one greater than the number in the shell 40. Because two shell layers are used, the thickness of each shell segment, e.g. about 0.6 to 0.76 mm, may be less, than that of a segment 40 in the cable 20.

The cable 110 of FIG. 8 provides still greater resistance to animal attack than the cables of FIGS. 1 and 4. This is due to the double layer of rodent-resistant material and to the increased cable diameter. Also, the inner shell 40 provides more rigid support to very high compressive forces than does the core tube 30 for the single shell of FIG. 1.

In preferred embodiments of the cable 110, the segments in the shells 40 and 114 and in the shells 40 and 132 are identical in material. However, it is within the scope of this invention that the materials in the segments in the one shell could differ from that of the segments in the other shell in the same cable.

It is to be understood that the above-described arrangements are simply illustrative of the invention. Other arrangements may be devised by those skilled in the art which will embody the principles of the invention and fall within the spirit and scope thereof.

We claim:

1. A cable, which comprises:
   a core which comprises at least one transmission media; and
   a sheath system which encloses said core, said sheath system comprising:
   a plurality of longitudinally extending segments cooperating to provide a shell enclosing said core with at least portions of facing longitudinal edge surfaces of adjacent segments preformed to be substantially contiguous, being stranded helically about said core and being sufficient in number to allow said cable to be routed in a path having a predetermined radius without damaging said cable, each of said segments being a composite comprising a substrate portion which is made of a dielectric material that provides suitable tensile and compressive strength for said cable and which has an outer surface provided with a layer of a coating material having a relatively high hardness which cooperates with the substrate layer to cause the shell segment to be characterized by a relatively high hardness; and at least one outer element being disposed about said segments and being effective to hold said segments in the configuration of said shell.

2. The cable of claim 1, wherein each of said segments is arcuately shaped in a cross section transverse to a longitudinal axis of said cable.

3. The cable of claim 2, wherein the dielectric shell comprises at least eight longitudinally extending segments.

4. The cable of claim 1, wherein said substrate portion of each segment is a composite.

5. The cable of claim 4, wherein said substrate portion of each of said segments comprises fibers embedded in a solid matrix material.

6. The cable of claim 4, wherein said substrate portion of each of said segments comprises resin bonded glass fibers.

7. The cable of claim 1, wherein said substrate portion of each segment comprises a homogeneous material.

8. The cable of claim 1, wherein each of the shell segments has a Shore D hardness which is at least about 90.

9. The cable of claim 1, wherein said coating material is a polycarbonate UV radiation cured material.

10. The cable of claim 1, wherein said coating material comprises a diamond film.

11. The cable of claim 1, wherein said coating material comprises a ceramic material.

12. The cable of claim 1, wherein the number of said segments is optimized to provide sufficient flexibility and is such so as not to impede the alignment of said segments during manufacture of said cable.

13. The cable of claim 1, wherein said longitudinal edge surfaces of each of said preformed segments extend substantially radially from the longitudinal axis of said cable.

14. The cable of claim 1, wherein said predetermined radius is at least as low as the product of ten and the outer diameter of said cable.

15. The cable of claim 1, which also includes a layer of a water blocking material which is disposed between said shell and said at least one outer element.

16. The cable of claim 1, wherein said segments form a generally circular shell which encloses said core and wherein each of said shell segments is provided with a coating of a superabsorbent material.

17. The cable of claim 1, wherein a waterblocking tape is disposed between said shell and a core tube which encloses said core.

18. The cable of claim 1, wherein said cable includes an outer jacket and an outer surface of each of said segments is bonded to an inner surface of said outer jacket.

19. The cable of claim 1, wherein each of said segments is provided with one longitudinal edge surface which has a projecting portion and another longitudinal edge portion which includes a longitudinal extending groove adapted to receive the projecting portion of an adjacent segment.

20. The cable of claim 1, wherein said shell is an inner shell and said sheath system also includes an outer shell which includes a plurality of said longitudinally extending segments.

21. The cable of claim 20, wherein said segments of said inner shell and said segments of said outer shell are made of the same material.

22. The cable of 20, wherein the number of segments in said outer shell is greater than the number of segments in said inner

* * * * *